United States Patent
Oetken et al.

(10) Patent No.: US 11,691,526 B2
(45) Date of Patent: Jul. 4, 2023

(54) MOBILE CHARGING STATION

(71) Applicant: Caterpillar Paving Products Inc., Brooklyn Park, MN (US)

(72) Inventors: Nicholas Alan Oetken, Brooklyn Park, MN (US); Jacob J. McAlpine, Otsego, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 313 days.

(21) Appl. No.: 16/848,052

(22) Filed: Apr. 14, 2020

(65) Prior Publication Data

US 2021/0316625 A1 Oct. 14, 2021

(51) Int. Cl.
| | |
|---|---|
| H02J 7/00 | (2006.01) |
| H02J 7/14 | (2006.01) |
| B60L 53/30 | (2019.01) |
| B60L 50/60 | (2019.01) |
| B60L 53/20 | (2019.01) |
| B60L 53/36 | (2019.01) |
| B60L 53/62 | (2019.01) |
| B60L 58/12 | (2019.01) |

(Continued)

(52) U.S. Cl.
CPC ............ *B60L 53/30* (2019.02); *B60L 50/60* (2019.02); *B60L 53/20* (2019.02); *B60L 53/36* (2019.02); *B60L 53/50* (2019.02); *B60L 53/62* (2019.02); *B60L 58/12* (2019.02); *B62D 53/00* (2013.01); *H02J 7/00712* (2020.01); *B60L 2210/30* (2013.01); *H02J 2207/20* (2020.01)

(58) Field of Classification Search
USPC .......................................................... 320/107
See application file for complete search history.

(56) References Cited

U.S. PATENT DOCUMENTS

| | | | | |
|---|---|---|---|---|
| 4,104,994 A | * | 8/1978 | Phillips | F02M 7/06 |
| | | | | 123/73 R |
| 5,583,418 A | * | 12/1996 | Honda | B60K 1/04 |
| | | | | 320/109 |
| 5,963,013 A | | 10/1999 | Watson et al. | |

(Continued)

FOREIGN PATENT DOCUMENTS

| | | |
|---|---|---|
| CN | 204408085 | 6/2015 |
| CN | 106828176 | 6/2017 |

(Continued)

*Primary Examiner* — Alexis B Pacheco (57) ABSTRACT

A mobile charging station for charging an electric construction vehicle during a transportation thereof includes a transportation vehicle. The transportation vehicle includes a first electric power source. The electric construction vehicle is adapted to be positioned on the transportation vehicle for transportation thereof. The mobile charging station includes a power management device adapted to be positioned on the transportation vehicle. The power management device is adapted to be coupled with each of the first electric power source and a battery system associated with the electric construction vehicle. The power management device is adapted to receive a first amount of electric power from the first electric power source and regulate the first amount of electric power received from the first electric power source. The power management device is further adapted to supply a second amount of electric power to the battery system.

20 Claims, 4 Drawing Sheets

(51) Int. Cl.
  *B62D 53/00* (2006.01)
  *B60L 53/50* (2019.01)

(56) References Cited

U.S. PATENT DOCUMENTS

| | | | |
|---|---|---|---|
| 7,514,803 | B2 | 4/2009 | Wilks |
| 7,712,760 | B2 * | 5/2010 | Ohtomo |
| 8,579,054 | B2 | 10/2013 | Knickerbocker |
| 9,321,361 | B2 | 4/2016 | Kamen et al. |
| 10,150,358 | B2 | 12/2018 | Soto |
| 10,309,871 | B2 | 6/2019 | Hagan, Jr. |
| 10,333,338 | B2 * | 6/2019 | Zenner |
| 10,389,121 | B1 * | 8/2019 | Sherry |
| 10,538,421 | B2 * | 1/2020 | Blevins |
| 2005/0001606 | A1 * | 1/2005 | Kagoshima ........... B60L 3/0046 323/371 |
| 2006/0048516 | A1 * | 3/2006 | Tenbrock ................ B60K 6/48 60/698 |
| 2010/0297883 | A1 * | 11/2010 | Burlak .................... H02H 3/12 439/620.21 |
| 2012/0273285 | A1 | 11/2012 | Jensen et al. |
| 2013/0002198 | A1 * | 1/2013 | McCluskey |
| 2016/0257293 | A1 * | 9/2016 | Takahashi ............. B60K 25/00 |
| 2018/0108252 | A1 * | 4/2018 | Pividori |
| 2019/0126768 | A1 | 5/2019 | Niwa et al. |
| 2019/0217711 | A1 * | 7/2019 | Miller |

FOREIGN PATENT DOCUMENTS

| | | |
|---|---|---|
| JP | 2008069517 | 3/2008 |
| JP | 6420120 | 11/2018 |
| WO | 2017017627 | 2/2017 |

* cited by examiner

MOBILE CHARGING STATION

TECHNICAL FIELD

The present disclosure relates to a mobile charging station for an electric construction vehicle.

BACKGROUND

Electrically driven construction vehicles are being widely used in various industries for performing one or more work operations. Such electric construction vehicles include a battery that propels the electric construction vehicles and also powers one or more components thereof. Further, the battery of the electric construction vehicles needs to be periodically charged to continue ongoing work operations. Typically, generators that output electric power are used for charging the battery of the electric construction vehicles. However, such generators are inconvenient to use in terms of maintenance, transportation, duration of charging, and reliability. Further, such generators employ an internal combustion engine for an operation thereof. The engine in turn requires fuel, thereby increasing cost associated with the charging of the electric construction vehicles and also increasing dependability on conventional sources of energy.

Further, in some cases, the electric construction vehicles are moved between different worksites. In such cases, the electric construction vehicles typically require charging once the electric construction vehicles reach a target worksite. Thus, it is not possible to put the electric construction vehicles to immediate use which may affect a productivity at the worksite as it may add to longer waiting times.

U.S. Pat. No. 7,514,803 describes a working surface incorporating a means for transferring mechanical energy produced by a rotating member of the working surface so that the energy rotates a shaft attached to an alternator that charges a bank of 12 V batteries. The alternator is responsible for converting the mechanical energy being input by the rotating shaft to electrical energy that is fed to the batteries. The batteries transfer the energy into an inverter for use depending upon the required amount. Thereby, backup electrical power may be generated and stored, taking advantage of excess horsepower at cruise provided by a vehicle as well as better utilizing travel time.

SUMMARY OF THE DISCLOSURE

In an aspect of the present disclosure, a mobile charging station for charging an electric construction vehicle during a transportation thereof is provided. The mobile charging station includes a transportation vehicle. The transportation vehicle includes a first electric power source. The electric construction vehicle is adapted to be positioned on the transportation vehicle for transportation thereof. The mobile charging station includes a power management device adapted to be positioned on the transportation vehicle. The power management device is adapted to be coupled with each of the first electric power source and a battery system associated with the electric construction vehicle. The power management device is adapted to receive a first amount of electric power from the first electric power source. The power management device is also adapted to regulate the first amount of electric power received from the first electric power source based on a power requirement of at least one of the battery system and the transportation vehicle. The power management device is further adapted to supply a second amount of electric power to the battery system based on the power requirement of the battery system.

In an aspect of the present disclosure a method of charging an electric construction vehicle during a transportation thereof is provided. The method includes providing a transportation vehicle for transporting the electric construction vehicle. The electric construction vehicle includes a first electric power source. The method also includes positioning the electric construction vehicle having a battery system and a power management device on the transportation vehicle. The power management device is adapted to be coupled with each of the first electric power source and the battery system. The method further includes receiving a first amount of electric power from the first electric power source. The method includes regulating the first amount of electric power received from the first electric power source based on a power requirement of at least one of the battery system and the transportation vehicle. The method also includes supplying a second amount of electric power to the battery system based on the power requirement of the battery system during the transportation of the electric construction vehicle.

Other features and aspects of this disclosure will be apparent from the following description and the accompanying drawings.

DETAILED DESCRIPTION

Figure 1:
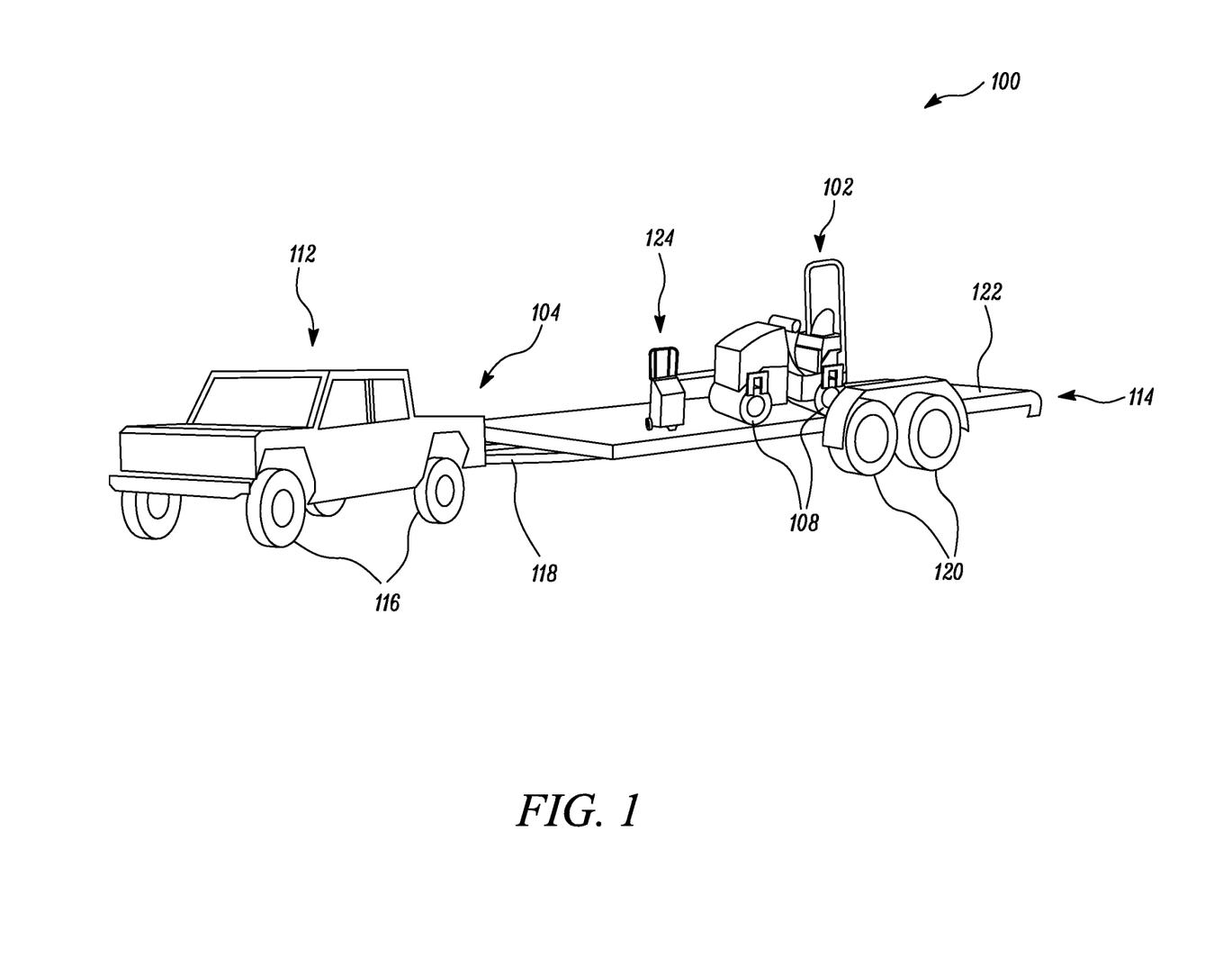
FIG. 1 illustrates a mobile charging station for charging an electric construction vehicle, in accordance with an embodiment of the present disclosure.

Wherever possible, the same reference numbers will be used throughout the drawings to refer to the same or like parts. FIG. 1 illustrates a mobile charging station 100 for charging an electric construction vehicle 102 during a transportation thereof. The electric construction vehicle 102 may be transported between various worksites, as per requirements. In the illustrated example, the electric construction vehicle 102 is a compactor. Alternatively, the electric construction vehicle 102 may be embodied as any other electric construction vehicle or power tool, as per application requirements.

Figure 2:
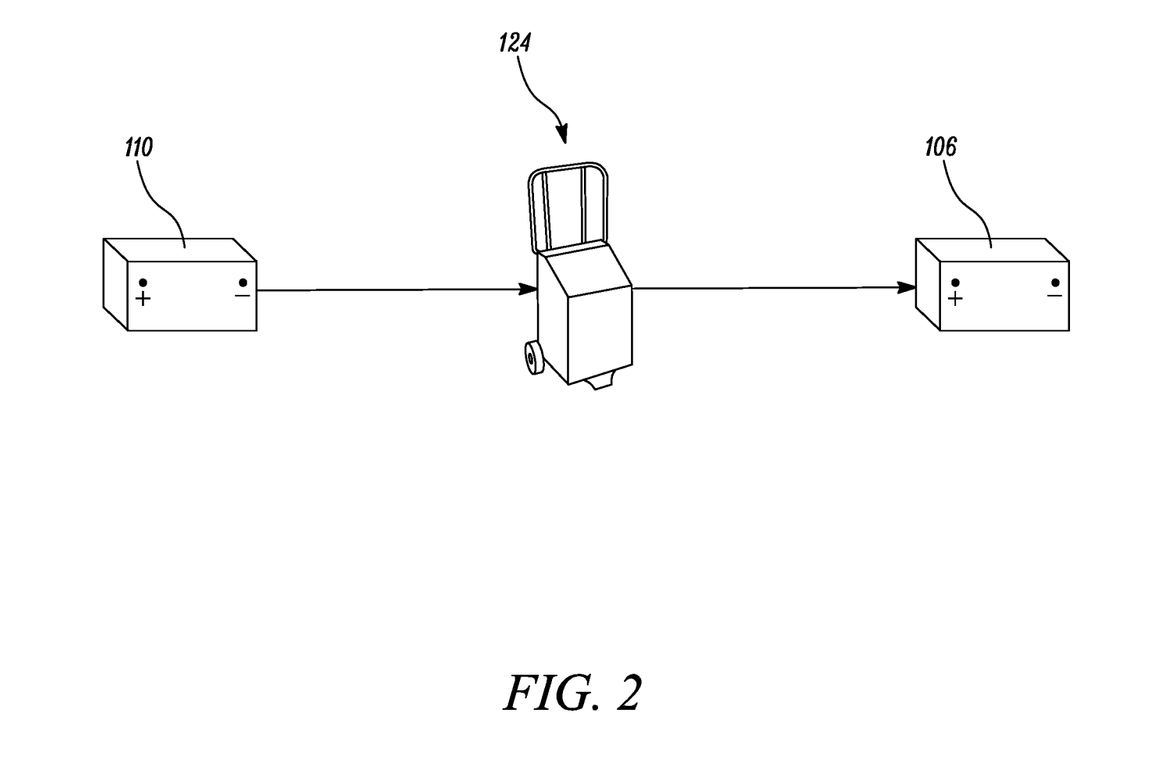
FIG. 2 is a schematic view illustrating usage of a battery pack for charging the electric construction vehicle of FIG. 1, in accordance with an embodiment of the present disclosure.
Figure 3:
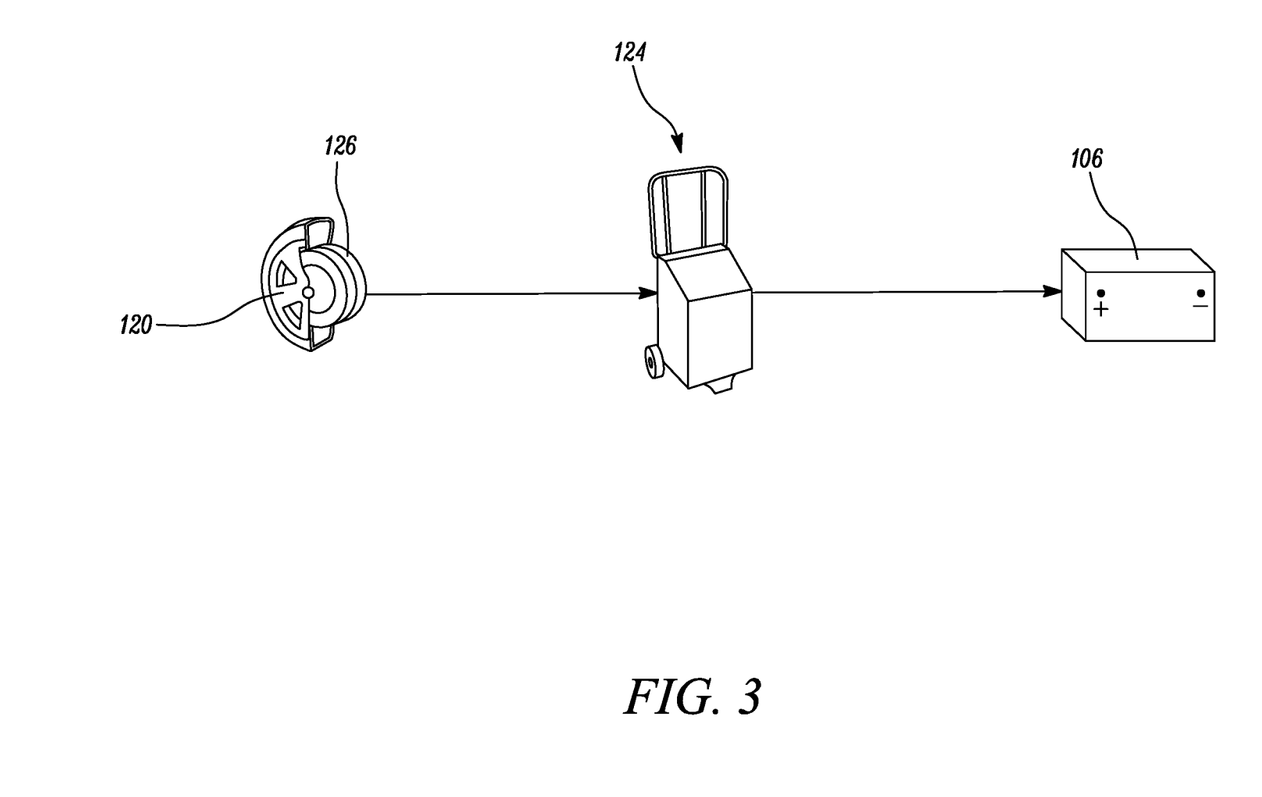
FIG. 3 is a schematic view illustrating usage of a power generation apparatus for charging the electric construction vehicle of FIG. 1, in accordance with another embodiment of the present disclosure.

The electric construction vehicle 102 includes a battery system 106 (shown in FIGS. 2 and 3, respectively). The battery system 106 is embodied as an electricity storage device for supplying electric power to one or more components of the electric construction vehicle 102. For example, the battery system 106 may supply electric power to a motor (not shown) that may allow propulsion of the electric construction vehicle 102. Further, the electric power from the battery system 106 may also power another motor, such as a motor associated with a vibratory system (not shown) of one or more drums 108 of the electric construction vehicle 102 for compaction purposes.

Further, the battery system 106 is periodically charged based on depletion of power level of the battery system 106. Thus, the battery system 106 needs to be charged periodically in order to ensure operation of the electric construction vehicle 102. The battery system 106 requires a source of Direct Current (DC) power for charging thereof. The battery system 106 may include a 12 Volts (V) battery, 24 V battery, 48 V battery, or higher, as per a size and operational requirements of the electric construction vehicle 102.

Further, the mobile charging station 100 includes a transportation vehicle 104. The transportation vehicle 104 includes a first electric power source 110, 126 (shown in FIGS. 2 and 3, respectively). The electric construction vehicle 102 is positioned on the transportation vehicle 104 for transportation thereof. Further, the transportation vehicle 104 includes a mobile vehicle 112 and a trailer 114 driven by the mobile vehicle 112. In the illustrated example, the mobile vehicle 112 is a battery powered vehicle. More particularly, the mobile vehicle 112 is a truck that operates on electric power. Accordingly, the mobile vehicle 112 includes a battery pack 110 for providing the electric power. In a first embodiment of the present disclosure that is explained in relation to FIG. 2, the first electric power source 110 is embodied as the battery pack 110. Thus, in the description provided for the first embodiment of FIG. 2, the first electric power source 110 may be interchangeably referred to as the battery pack 110.

In other examples, the mobile vehicle 112 of FIG. 1 may include an engine or the mobile vehicle 112 may be embodied as a hybrid vehicle. Even if the mobile vehicle 112 is operated by the engine, the mobile vehicle 112 may include one or more battery packs associated therewith. The one or more battery packs may be in turn charged by the engine. Further, the mobile vehicle 112 includes wheels 116 that allow movement of the mobile vehicle 112 on grounds. It should be noted that the mobile vehicle 112 may embody any other vehicle instead of a truck, without any limitations.

As shown in FIG. 1, the transportation vehicle 104 includes the trailer 114. The mobile vehicle 112 pulls the trailer 114. The trailer 114 is coupled to the mobile vehicle 112. A hitch assembly 118 allows coupling of the trailer 114 with the mobile vehicle 112. The hitch assembly 118 is coupled with a bracket member (not shown) disposed at a rear end of the mobile vehicle 112. The trailer 114 includes wheels 120 that allow movement of the trailer 114. In the illustrated example, the trailer 114 includes a pair of wheels 120 at each side of the trailer 114.

Further, the trailer 114 includes a deck 122. The deck 122 allows positioning and support of one or more components or vehicles on the trailer 114 for transportation of such components or vehicles. In the illustrated example, the electric construction vehicle 102 and a power management device 124 is positioned on the trailer 114. Further, the trailer 114 may include an enclosed trailer or the trailer 114 may include sidewalls, without any limitations. It should be noted that the trailer 114 illustrated herein is exemplary in nature, and the trailer may include any other size or shape, as per application requirements.

FIG. 2 illustrates the first embodiment of the mobile charging station 100. In this embodiment, the first electric power source 110 includes the battery pack 110 associated with the mobile vehicle 112. Thus, in the illustrated embodiment, the battery pack 110 outputs a first amount of electric power in the form of DC power. In some examples, the battery pack 110 includes Lithium-ion batteries. In other examples, ultracapacitors may be used as the first electric power source 110. Further, the battery pack 110 typically includes rechargeable batteries. It should be noted that the mobile vehicle 112 may include a single battery pack 110, or the mobile vehicle 112 may include a number of battery packs 110, without any limitations. The battery pack 110 may output 12 V, 24 V, 48 V of DC power, or higher, as per a size and operational requirements of the mobile vehicle 112.

The mobile charging station 100 further includes the power management device 124. The power management device 124 is embodied as a charge controller that may include a control module and various other components that allow regulation of an input power supply and an output power supply, as per application requirements. As mentioned above, the power management device 124 is positioned on the transportation vehicle 104. Further, the power management device 124 is coupled with each of the first electric power source 110 and the battery system 106 associated with the electric construction vehicle 102. The power management device 124 is connected to each of the battery pack 110 and the battery system 106 using corresponding electrical wires. Thus, the power management device 124 provides electrical connection between the battery pack 110 and the battery system 106.

Further, the power management device 124 receives the first amount of electric power from the first electric power source 110. As the first electric power source 110 includes the battery pack 110 herein, the power management device 124 receives the first amount of electric power from the battery pack 110. Further, the power management device 124 regulates the first amount of electric power received from the first electric power source 110 based on a power requirement of the battery system 106 or the transportation vehicle 104. In one example, the power management device 124 regulates a voltage of a second amount of electric power directed to the electric construction vehicle 102 based on a voltage requirement of the battery system 106. More particularly, in some examples, the voltage requirement of the battery system 106 may be different from a voltage output of the first electric power source 110. For example, the first electric power source 110 may output 24 V of DC power and the battery system 106 may include 12 V batteries. Accordingly, the power management device 124 may convert the 24 V of DC power to 12 V of DC power so as to suit the voltage requirement of the battery system 106.

Further, the power management device 124 also regulates the first amount of electric power received from the first electric power source 110 based on the power requirement of the first electric power source 110, and more specifically the battery pack 110. It should be noted that the power management device 124 regulates the first amount of electric power based on an existing power level in the battery pack 110. In an example, the power management device 124 may include means to determine the existing power level in the battery pack 110. Thus, the power management device 124 receives and regulates the first amount of electric power only if the battery pack 110 is sufficiently charged. Further, if the existing power level in the battery pack 110 reduces below a predetermined threshold, electrical connection between the power management device 124 and the battery pack 110 may be cut off to eliminate depletion of the existing power level in the battery pack 110.

Moreover, the power management device 124 supplies the second amount of electric power to the battery system 106 based on the power requirement of the battery system 106. It should be noted that the power management device 124 supplies the second amount of electric power to the battery system 106 based on an existing power level in the battery system 106. More particularly, the power management device 124 may include means to determine the existing power level in the battery system 106. Accordingly, the power management device 124 supplies the second amount of electric power to the battery system 106 until the battery system 106 is fully charged. Once the battery system 106 is fully charged, the power management device 124 may stop supplying the second amount of electric power to the battery system 106.

In the illustrated embodiment, the power management device 124 and the electric construction vehicle 102 are positioned on the trailer 114. However, in some embodiments, the trailer 114 may be replaced by a mobile vehicle that is large enough to accommodate the power management device 124 and the electric construction vehicle 102 therein. In such embodiments, the power management device 124 and the electric construction vehicle 102 may be positioned within a carrier of the large sized mobile vehicle.

FIG. 3 illustrates a second embodiment of the mobile charging station 100. In this embodiment, the first electric power source 126 includes a power generation apparatus 126 associated with the trailer 114. Thus, in the illustrated embodiment, the first electric power source 126, and more particularly, the power generation apparatus 126 output the first amount of electric power in the form of Alternating Current (AC) power or DC power. It should be noted that in the description related to the second embodiment explained in relation to FIG. 3, the first electric power source 126 may be interchangeably referred to as the power generation apparatus 126.

In the illustrated embodiment, the power generation apparatus 126 is coupled with the one or more wheels 120 of the trailer 114. In an example, the first electric power source 126 may embody a single power generation apparatus 126 associated with one of the wheels 120. Alternatively, the first electric power source 126 may embody a number of power generation apparatuses 126 associated the number of wheels 120 of the trailer 114. In such examples, the first electric power source 126 may output an increased amount of power. In one embodiment of the present disclosure, the power generation apparatus 126 is an electric generator coupled with the one or more wheels 120 of the trailer 114. More particularly, the electric generator is integrated with the wheels 120 of the trailer 114. The electric generator may embody a dynamo or an alternator, as per application requirements. When the trailer 114 moves between different worksites, the electric generator operates to harvest energy based on rotation of the wheels 120 of the trailer 114. The mechanical energy is converted to electric energy that is directed towards the power management device 124.

Further, the power management device 124 receives and regulates the first amount of electric power from the first electric power source 126, and more specifically, the power generation apparatus 126. The power management device 124 is connected to each of the power generation apparatus 126 and the battery system 106 using corresponding electrical wires. Thus, the power management device 124 provides electrical connection between the power generation apparatus 126 and the battery system 106.

As mentioned above, the power generation apparatus 126 may output AC power or DC power. When the power generation apparatus 126 outputs DC power, the power management device 124 may regulate the first amount of electric power based on the power requirement of the battery system 106. However, in some examples, when the power generation apparatus 126 outputs AC power, the power management device 124 may convert AC power into DC power. In other embodiments, the power generation apparatus 126 may itself include a number of components to convert AC power to DC power, such as, breakers, contactor, filters, inverters, capacitors, inductors, fuses, cooling units, and the like.

In some embodiments, the power generation apparatus 126 may also be coupled with the wheels 116 (see FIG. 1) of the mobile vehicle 112 (see FIG. 1). In yet another embodiment, the power generation apparatus 126 may be coupled to one or more wheels 120 and one or more wheels 116 to assist in bulk power production. In yet other embodiments, any additional power generated by the wheels 120 of the trailer 114 also be supplied to the battery pack 110 of the mobile vehicle 112.

Further, although the battery system 106 of a single electric construction vehicle 102 is being charged by the first electric power source 110, 126 explained in relation to FIGS. 2 and 3, respectively, it may be contemplated that more than one electric construction vehicle 102 may be positioned on the trailer 114 (see FIG. 1). In such examples, the battery systems 106 of all such electric construction vehicles 102 may be coupled with the power management device 124.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICATION

Figure 4:
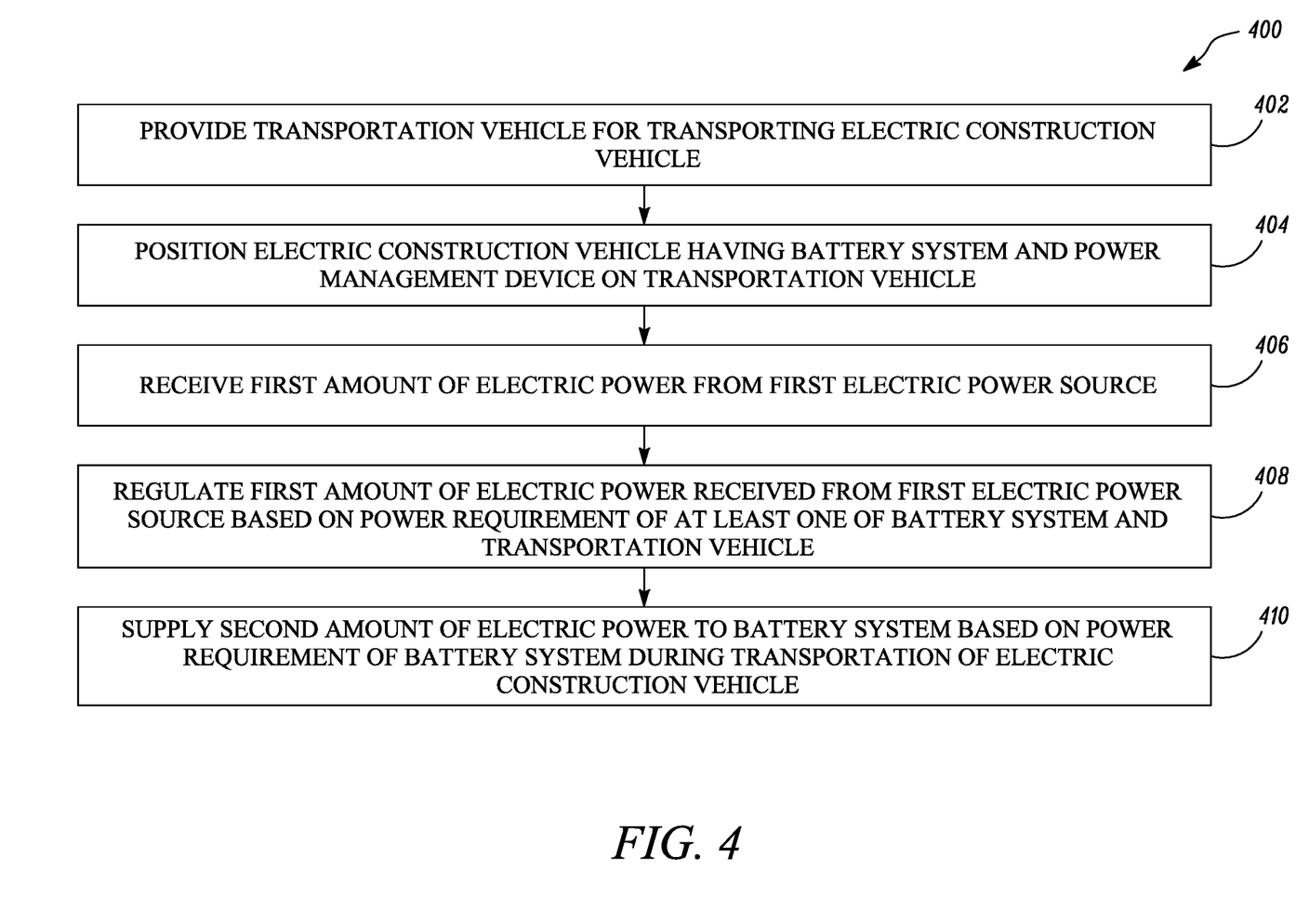
FIG. 4 is a flowchart for a method of charging the electric construction vehicle.

FIG. 4 illustrates a method 400 of charging the electric construction vehicle 102 during the transportation thereof. At step 402, the transportation vehicle 104 is provided for transporting the electric construction vehicle 102. The transportation vehicle 104 includes the first electric power source 110, 126. At step 404, the electric construction vehicle 102 having the battery system 106 and the power management device 124 are positioned on the transportation vehicle 104. The power management device 124 is coupled with each of the first electric power source 110, 126 and the battery system 106. Further, the electric construction vehicle 102 and the power management device 124 are positioned on the trailer 114 of the transportation vehicle 104. The trailer 114 is driven by the mobile vehicle 112 of the transportation vehicle 104.

At step 406, the first amount of electric power is received from the first electric power source 110, 126. In one example, the power management device 124 receives the first amount of electric power from the battery pack 110 associated with the mobile vehicle 112. The power management device 124 is coupled with the battery pack 110 to receive the first amount of electric power therefrom. In another example, the power management device 124 receives the first amount of electric power from the power generation apparatus 126 associated with the trailer 114. The power management device 124 is coupled with the power generation apparatus 126 to receive the first amount of electric power therefrom. The power generation apparatus 126 is coupled with one or more wheels 120 of the trailer 114. More particularly, the electric generator is coupled with one or more wheels 120 of the trailer 114. Accordingly, the power management device 124 is coupled with the electric generator to receive the first amount of electric power therefrom.

At step 408, the first amount of electric power received from the first electric power source 110, 126 is regulated based on the power requirement of the battery system 106 or the transportation vehicle 104. In some examples, the power management device 124 converts AC power received from the first electric power source 110, 126 into DC power. Moreover, the power management device 124 regulates the voltage of the second amount of electric power based on the voltage requirement of the battery system 106. At step 410, the second amount of electric power is supplied to the battery system 106 based on the power requirement of the battery system 106 during the transportation of the electric construction vehicle 102. In an example, the power management device 124 supplies the second amount of electric power to the battery system 106 based on the existing power level in the battery system 106.

The mobile charging station 100 described in the present disclosure allows charging of the battery system 106 of the electric construction vehicle 102 during the transportation of the electric construction vehicle 102 from one location to another. As the battery system 106 is charged during transportation, the electric construction vehicle 102 may be ready to use once the electric construction vehicle 102 reaches a particular worksite thereby allowing immediate start of a work operation at the said worksite. Thus, any wastage of time or resources at the worksite may be prevented. The mobile charging station 100 provides a valuable charging alternative to other charging devices, such as generators that typically use fuels for operation thereof.

The battery system 106 may be charged by power generated based on the rotation of the wheels 120 of the trailer 114 or by the battery pack 110 of the mobile vehicle 112. The usage of the battery pack 110 or the power generation apparatus 126 may eliminate requirement of the generator operating on fuels. Further, the power generation apparatus 126 may produce electrical energy based on conversion of mechanical energy which may help to reduce carbon footprint and provides a cleaner source of energy.

The mobile charging station 100 includes the power management device 124 that is embodied as a controller to modify one or more characteristics of the first amount of electric power to suit the power requirements of the battery system 106. Further, the power management device 124 monitors the existing power level in the battery system 106 and the transportation vehicle 104, and accordingly allows charging of the battery system 106. Accordingly, the power management device 124 may cut off power supply to the battery system 106 when the battery system 106 approaches full power level thereby eliminating overcharging of the battery system 106. Further, the power management device 124 may cut off receipt of power supply from the battery pack 110 if the exiting power level in the battery pack 110 reduces below the predetermined threshold to eliminate a possibility of stalling of the mobile vehicle 112. It should be noted that the mobile charging station 100 may be used to charge battery systems of fully electric vehicles or hybrid vehicles, without any limitations.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof

What is claimed is:

1. A mobile charging station for charging an electric construction vehicle during a transportation thereof, the mobile charging station comprising:
    a transportation vehicle including a first electric power source, wherein the electric construction vehicle is adapted to be positioned on the transportation vehicle for transportation thereof; and
    a power management device adapted to be positioned on the transportation vehicle, wherein the power management device is adapted to be coupled with each of the first electric power source and a battery system associated with the electric construction vehicle, and wherein the power management device is adapted to:
        receive a first amount of electric power from the first electric power source;
        regulate the first amount of electric power received from the first electric power source, based on a power requirement of the transportation vehicle, such that an amount of electric power stored by the first electric power source is maintained above a minimum threshold associated with operation of the transportation vehicle; and
        supply a second amount of electric power to the battery system based on the power requirement of the battery system.

2. The mobile charging station of claim 1, wherein the transportation vehicle includes a mobile vehicle and a trailer adapted to be driven by the mobile vehicle, and wherein the first electric power source of the transportation vehicle comprises a battery configured to store at least the amount of electric power.

3. The mobile charging station of claim 2, wherein the mobile vehicle is a battery powered vehicle, and
    the power management device is configured to terminate an electrical connection between the power management device and the first electric power source based on the amount of electric power stored by the first electric power source decreasing to a level below the minimum threshold.

4. The mobile charging station of claim 2, wherein the electric construction vehicle is adapted to be positioned on the trailer, and
    the power management device is separate from the transportation vehicle and removably disposed on the trailer.

5. The mobile charging station of claim 2, wherein the first electric power source includes a battery pack associated with the mobile vehicle.

6. The mobile charging station of claim 2, wherein the first electric power source includes a power generation apparatus associated with the trailer.

7. The mobile charging station of claim 6, wherein the power generation apparatus is coupled with at least one wheel of the trailer.

8. The mobile charging station of claim 7, wherein the power generation apparatus is an electric generator coupled with the at least one wheel of the trailer.

9. The mobile charging station of claim 1, wherein the power management device is adapted to supply the second amount of electric power to the battery system based on an existing power level in the battery system, and
    movably disposed on the transportation vehicle relative to the first electric power source.

10. The mobile charging station of claim 1, wherein the first amount of electric power is an Alternating Current (AC)

power, and wherein the power management device is adapted to convert AC power into Direct Current (DC) power.

11. The mobile charging station of claim 1, wherein the power management device is adapted to regulate a voltage of the second amount of electric power based on a voltage requirement of the battery system.

12. A method of charging an electric construction vehicle during a transportation thereof, the method comprising:
  providing a transportation vehicle for transporting the electric construction vehicle, the transportation vehicle including a first electric power source;
  positioning the electric construction vehicle having a battery system and a power management device on the transportation vehicle, wherein the power management device is adapted to be coupled with each of the first electric power source and the battery system;
  receiving a first amount of electric power from the first electric power source;
  regulating the first amount of electric power received from the first electric power source, based on a power requirement of the transportation vehicle, such that an amount of electric power stored by the first electric power source is maintained above a minimum threshold associated with operation of the transportation vehicle; and
  supplying a second amount of electric power to the battery system based on the power requirement of the battery system during the transportation of the electric construction vehicle.

13. The method of claim 12 further comprising positioning the electric construction vehicle and the power management device on a trailer of the transportation vehicle, wherein the trailer is driven by a mobile vehicle of the transportation vehicle.

14. The method of claim 13 further comprising receiving, by the power management device, the first amount of electric power from a battery pack associated with the mobile vehicle, wherein the power management device is adapted to be coupled with the battery pack to receive the first amount of electric power therefrom.

15. The method of claim 13 further comprising receiving, by the power management device, the first amount of electric power from a power generation apparatus associated with the trailer, wherein the power management device is adapted to be coupled with the power generation apparatus to receive the first amount of electric power therefrom.

16. The method of claim 15 further comprising coupling the power generation apparatus with at least one wheel of the trailer.

17. The method of claim 16 further comprising coupling an electric generator with the at least one wheel of the trailer, wherein the power management device is adapted to be coupled with the electric generator to receive the first amount of electric power therefrom.

18. The method of claim 12 further comprising supplying, by the power management device, the second amount of electric power to the battery system based on an existing power level in the battery system.

19. The method of claim 12 further comprising converting, by the power management device, an Alternating Current (AC) power received from the first electric power source into Direct Current (DC) power.

20. The method of claim 12 further comprising regulating, by the power management device, a voltage of the second amount of electric power based on a voltage requirement of the battery system.

* * * * *